(12) United States Patent
Kotlyar et al.

(10) Patent No.: US 8,456,036 B2
(45) Date of Patent: *Jun. 4, 2013

(54) INPUT AND OUTPUT POWER MODULES CONFIGURED TO PROVIDE SELECTIVE POWER TO AN UNINTERRUPTIBLE POWER SUPPLY

(75) Inventors: Edward Kotlyar, Needham, MA (US); Mirza A. Beg, Pepperell, MA (US); Marcel B. Grenier, East Greenwich, RI (US); Venkatraman Chennakesavan, Groton, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 425 days.

This patent is subject to a terminal disclaimer.

(21) Appl. No.: 12/861,014

(22) Filed: Aug. 23, 2010

(65) Prior Publication Data
US 2010/0314944 A1     Dec. 16, 2010

Related U.S. Application Data

(63) Continuation of application No. 11/836,995, filed on Aug. 10, 2007, now Pat. No. 7,781,914.

(51) Int. Cl.
*H02J 9/00* (2006.01)
(52) U.S. Cl.
USPC ............................................. 307/65; 307/56
(58) Field of Classification Search
USPC ............ 307/64–66, 147, 43, 56, 80; 174/261
See application file for complete search history.

(56) References Cited

U.S. PATENT DOCUMENTS

| 3,007,129 A | 10/1961 | Nielsen |
| 4,131,805 A * | 12/1978 | Austin et al. ................... 307/147 |
| 4,560,886 A | 12/1985 | Ferguson |
| 4,595,248 A | 6/1986 | Brown |

(Continued)

FOREIGN PATENT DOCUMENTS

| CN | 1360381 A | 7/2002 |
| CN | 1964158 A | 5/2007 |

(Continued)

OTHER PUBLICATIONS

International Search Report for PCT/US2008/071331 mailed Feb. 11, 2009.

(Continued)

*Primary Examiner* — Fritz M Fleming
(74) *Attorney, Agent, or Firm* — Lando & Anastasi, LLP

(57) ABSTRACT

An uninterruptible power supply ("UPS") includes an input module having a plurality of inputs, and at least one jumper element configured to selectively couple at least one input of the plurality of inputs to at least one other input of the plurality of inputs. The plurality of inputs and the at least one jumper element may be constructed and arranged to selectively achieve the following configurations: single power feed, single phase input and single phase output; dual power feed, single phase input and single phase output; single power feed, three phase input and single phase output; dual power feed, three phase input and single phase output; single power feed, three phase input and three phase output; and dual power feed, three phase input and three phase output. Other embodiments and methods of selectively achieving multiple power configurations are also disclosed.

20 Claims, 8 Drawing Sheets

U.S. PATENT DOCUMENTS

| | | | |
|---|---|---|---|
| 5,227,262 A | 7/1993 | Ozer | |
| 5,319,571 A | 6/1994 | Langer et al. | |
| 5,349,282 A | 9/1994 | McClure | |
| 5,402,008 A * | 3/1995 | St. John | 307/64 |
| 5,422,558 A | 6/1995 | Stewart | |
| 5,477,091 A | 12/1995 | Fiorina et al. | |
| 5,516,303 A | 5/1996 | Yohn et al. | |
| 5,610,368 A | 3/1997 | Smith | |
| 5,633,564 A | 5/1997 | Edwards et al. | |
| 5,663,525 A | 9/1997 | Newman | |
| 5,886,890 A | 3/1999 | Ishida et al. | |
| 5,901,057 A | 5/1999 | Brand et al. | |
| 5,982,652 A | 11/1999 | Simonelli et al. | |
| 6,121,695 A | 9/2000 | Loh | |
| 6,161,524 A | 12/2000 | Akbarian et al. | |
| 6,201,319 B1 | 3/2001 | Simonelli et al. | |
| 6,274,950 B1 | 8/2001 | Gottlieb et al. | |
| 6,310,783 B1 | 10/2001 | Winch et al. | |
| 6,356,470 B1 | 3/2002 | Sadler et al. | |
| 6,400,043 B1 | 6/2002 | Batson et al. | |
| 6,424,119 B1 | 7/2002 | Nelson et al. | |
| 6,445,088 B1 | 9/2002 | Spitaels et al. | |
| 6,489,561 B2 | 12/2002 | Ziegler et al. | |
| 6,511,328 B2 | 1/2003 | Molus et al. | |
| 6,531,790 B2 * | 3/2003 | Panuce et al. | 307/64 |
| 6,700,351 B2 | 3/2004 | Blair et al. | |
| 6,773,285 B2 | 8/2004 | Bernat et al. | |
| 6,803,678 B2 | 10/2004 | Gottlieb et al. | |
| 6,841,898 B2 * | 1/2005 | Moran | 307/80 |
| 6,922,347 B2 | 7/2005 | Lanni | |
| 7,265,645 B2 | 9/2007 | Carrier et al. | |
| 7,273,447 B2 | 9/2007 | Schneider et al. | |
| 7,394,170 B2 * | 7/2008 | Kirkorian | 307/69 |
| 7,781,914 B2 * | 8/2010 | Kotlyar et al. | 307/65 |
| 2002/0136042 A1 | 9/2002 | Layden et al. | |
| 2005/0162019 A1 | 7/2005 | Masciarelli et al. | |
| 2005/0162129 A1 | 7/2005 | Mutabdzija et al. | |
| 2005/0162836 A1 | 7/2005 | Briggs et al. | |
| 2005/0164563 A1 | 7/2005 | Schuttler et al. | |

FOREIGN PATENT DOCUMENTS

| | | |
|---|---|---|
| EP | 0340952 A1 | 11/1989 |
| EP | 0574628 A1 | 12/1993 |
| EP | 0575060 A1 | 12/1993 |
| RU | 2 025 862 C1 | 12/1994 |
| RU | 62485 U1 | 4/2007 |
| RU | 101863 U1 | 1/2011 |
| WO | 95/01692 A1 | 1/1995 |
| WO | 97/14206 A1 | 4/1997 |
| WO | 2007/070955 A1 | 6/2007 |

OTHER PUBLICATIONS

Patent Abstracts of Japan, vol. 1997, No. 12, Dec. 25, 1997 & JP 09 213423 A (Japan Aviation Electron Ind. Ltd.), Aug. 15, 1997, 1 pg.
Patent Abstracts of Japan, vol. 1999, No. 9, Jul. 30, 1999 & JP 11 097092 A (Fujitsu Denso Ltd.), Apr. 9, 1999, 1 pg.
Patent Abstracts of Japan, vol. 2003, No. 12, Dec. 5, 2003 & JP 2003 346940 A (NEC Commun Syst Ltd.), 1 pg.
Symmetra Brochure, "Server, Network and Telecom Power Solutions," pp. 1-20, copyright 2001.
International Search Report for PCT/US2005/001929 mailed Apr. 5, 2006.
Chinese Search Report for Application No. 2008801027184 issued on Aug. 20, 2012.

* cited by examiner

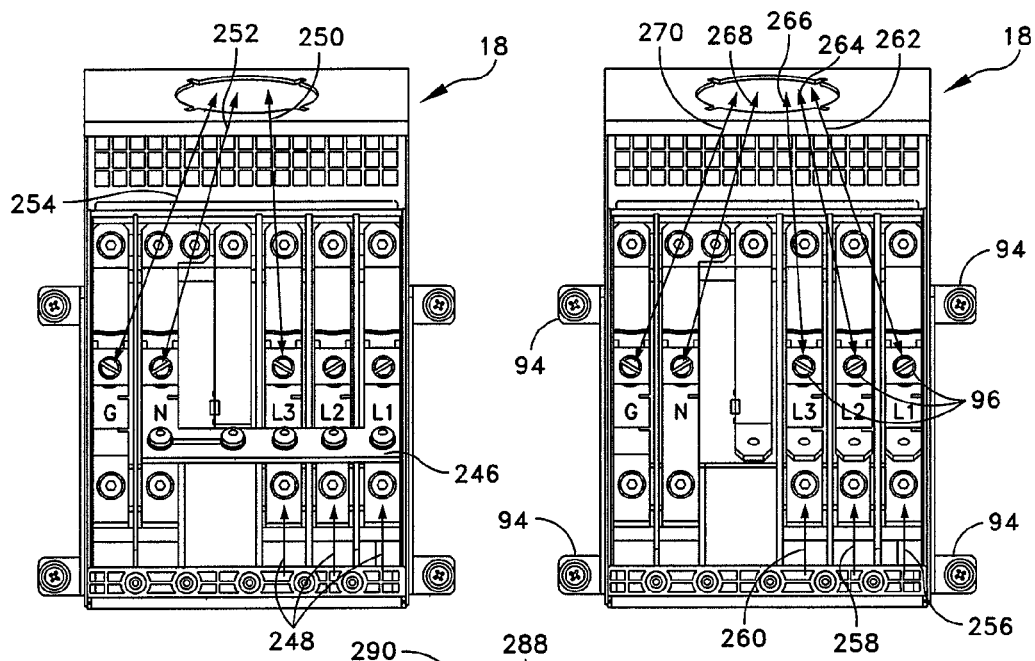
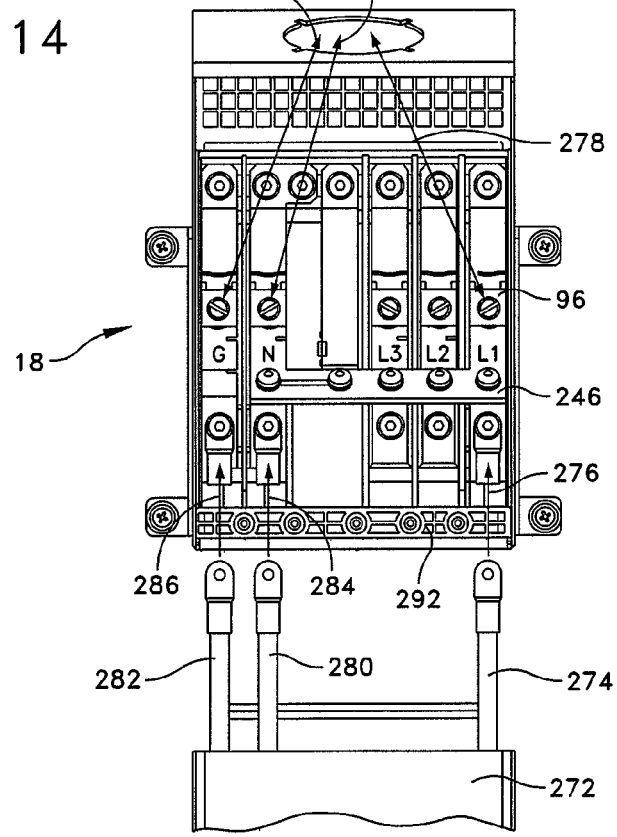
FIG. 14
FIG. 15
FIG. 16

INPUT AND OUTPUT POWER MODULES CONFIGURED TO PROVIDE SELECTIVE POWER TO AN UNINTERRUPTIBLE POWER SUPPLY

CROSS-REFERENCE TO RELATED APPLICATION

This application is a continuation of U.S. patent application Ser. No. 11/836,995, filed on Aug. 10, 2007, now U.S. Pat. No. 7,781,914 entitled INPUT AND OUTPUT POWER MODULES CONFIGURED TO PROVIDE SELECTIVE POWER TO AN UNINTERRUPTIBLE POWER SUPPLY, which is incorporated herein by reference in its entirety.

BACKGROUND OF THE INVENTION

1. Field of the Invention

Embodiments of the present invention are directed to power inputs and outputs used in a power system, and more particularly to a power input and a power output that may be selectively configured to accommodate changes in the power requirements of an uninterruptible power supply.

2. Discussion of Related Art

The use of an uninterruptible power supply or "UPS" to provide power to a critical load is well known in the art. The UPS is designed to protect electronic equipment from utility power blackouts, brownouts, sags and surges. The UPS may also protect electronic equipment from small utility fluctuations and large disturbances. In most configurations, the UPS provides battery backup until utility power returns to safe levels or the batteries are fully discharged. Known uninterruptible power systems include on-line UPSs and off-line UPSs. On-line UPSs provide conditioned AC power as well as backup AC power upon interruption of a primary source of AC power. Off-line UPSs typically do not provide conditioning of input AC power, but do provide backup AC power upon interruption of the primary AC power source. On-line UPSs of the type described above are available from American Power Conversion Corporation, West Kingston, R.I. under a variety of different trade names. In certain configurations, a UPS may include an input circuit breaker/filter, a rectifier, a control switch, a controller, a battery, an inverter, and a bypass switch. The UPS also may include an input for coupling to an AC power source and an output for coupling to a load.

The on-line UPS as described may be configured to operate as follows. The circuit breaker/filter receives input AC power from the AC power source through the input, filters the input AC power and provides filtered AC power to the rectifier. The rectifier rectifies the input voltage. The control switch receives the rectified power and also receives DC power from the battery. The controller determines whether the power available from the rectifier is within predetermined tolerances, and if so, controls the control switch to provide the power from the rectifier to the inverter. If the power from the rectifier is not within the predetermined tolerances, which may occur because of brownout or blackout conditions, or due to power surges, for example, then the controller controls the control switch to provide the DC power from the battery to the inverter. The inverter of the UPS receives DC power and converts the DC power to AC power and regulates the AC power to predetermined specifications. Depending on the capacity of the battery and the power requirements of the load, the UPS can provide power to the load during brief power source dropouts or for extended power outages. The bypass switch is used to provide a bypass of UPS circuitry to provide the input power directly to the output. The bypass switch may be controlled by the controller to provide bypass of the UPS circuitry upon a failure condition of the UPS.

To provide further power redundancy, it is known to use a second power source to supply power to a bypass switch of a UPS from a second source of AC power. Systems of this type are often referred to as dual main systems, which are similar to the UPS described above except that it includes a second input to couple to a second power supply. The dual main UPS may include a bypass switch that selectively couples the second input directly to the output of the UPS. In dual main systems, typically, a utility power source is coupled to the first power input of the system and a backup power source, such as a generator or utility power from a different grid, is coupled to the second power input of the system. Upon failure of the utility power source, the power system is able to continue to provide power to a load using the battery mode of operation of the UPS, while the generator is powered on and brought to full output voltage. Once the generator is on line, the power system can continue to provide output power in a bypass mode for an extended period of time from the generator.

Power inputs and outputs for such systems are usually selected based on the user requirements for the particular UPS. For example, for systems requiring single phase input and single phase output, a UPS is selected to meet this requirement. Similarly, for systems requiring either three phase input and single phase output, or any other combination of input and output phases, a UPS meeting this requirement is selected. If power requirements change, a user must acquire a different UPS to meet the new requirement.

BRIEF SUMMARY OF THE INVENTION

An aspect of the invention may be directed to an uninterruptible power supply ("UPS") comprising an input module including a plurality of inputs, and at least one jumper element configured to selectively couple at least one input of the plurality of inputs to at least one other input of the plurality of inputs. The plurality of inputs and the at least one jumper element may be constructed and arranged to selectively achieve the following configurations: single power feed, single phase input and single phase output; dual power feed, single phase input and single phase output; single power feed, three phase input and single phase output; dual power feed, three phase input and single phase output; single power feed, three phase input and three phase output; and dual power feed, three phase input and three phase output.

Embodiments of the UPS may include providing the plurality of inputs with three primary inputs L1, L2 and L3 and three bypass inputs B1, B2 and B3. The at least one jumper element may comprise a bypass shorting jumper element configured to couple the three bypass inputs B1, B2 and B3 to one another to achieve the dual power feed, three phase input and single phase output configuration. The at least one jumper element further may comprise a main shorting jumper element configured to couple the three primary inputs L1, L2 and L3 to one another to achieve the dual power feed, single phase input and single phase output configuration. The at least one jumper element further may comprise a first secondary jumper element configured to couple the primary input L1 and the bypass input B1 to one another to achieve the single power feed, three phase input and single phase output configuration. The at least one jumper element further may comprise a first secondary jumper element configured to couple the primary input L1 and the bypass input B1 to one another, a second secondary jumper element configured to couple the primary input L2 and the bypass input B2 to one another, and a third secondary jumper element configured to couple the primary input L3 and the bypass input B3 to one another to achieve the single power feed, single phase input and single phase output configuration. The at least one jumper element may comprise a first secondary jumper element configured to couple the primary input L1 and the bypass input B1 to one another, a second secondary jumper element configured to couple the primary input L2 and the bypass input B2 to one another, and a third secondary jumper element configured to couple the primary input L3 and the bypass input B3 to one another to achieve the single power feed, three phase input and three phase output configuration. The dual feed, three phase input and three phase output configuration may be achieved without the at least one jumper element coupled to any of the plurality of inputs. The plurality of inputs further may comprise a neutral input and a ground input, and wherein each input of the plurality of inputs comprises at least one screw lug configured to secure a wire to each input. The ground input may comprise at least two screw lugs positioned adjacent one another. The at least one jumper element may include at least one blocking segment to selectively block the coupling of a wire to at least one of the plurality of inputs. The UPS further may comprise an output module including a plurality of outputs and an output module jumper element configured to couple at least two outputs of the plurality of outputs to one another. The plurality of outputs may comprise outputs L1, L2 and L3. The plurality of outputs further may comprise a neutral output and a ground output. The jumper element further may couple the neutral output to at least one of the plurality of outputs. The UPS further may comprise a battery pack power distribution unit coupled to one of the plurality of outputs of the output power module.

Another aspect of the invention may be directed to a method of selectively achieving multiple power configurations in an uninterruptible power supply of the type comprising an input module having three primary inputs L1, L2 and L3 and three bypass inputs B1, B2 and B3, and at least one jumper element configured to selectively couple at least one input of the plurality of inputs to at least one other input of the plurality of inputs. The at least one jumper element may comprise a main shorting jumper element configured to couple the three primary inputs L1, L2 and L3 to one another, a bypass shorting jumper element configured to couple the three bypass inputs B1, B2 and B3 to one another, a first secondary jumper element configured to couple the primary input L1 to the bypass input B1, a second secondary jumper element configured to couple the primary input L2 to the bypass input B2, and a third secondary jumper element configured to couple the primary input L3 to the bypass input B3. In one embodiment, the method may comprise installing the bypass shorting jumper element to achieve a dual power feed, a three phase input and a single phase output configuration.

In other embodiments, the method further may comprise installing the main shorting jumper element to achieve a dual power feed, a single phase input and a single phase output configuration. The method further may comprise installing the first secondary jumper element to achieve a single power feed, a three phase input and a single phase output configuration. The method further may comprise installing the main shorting jumper element, the first secondary jumper element, the second secondary jumper element and the third secondary jumper element to achieve a single feed, a single phase input and a single phase output configuration. In another embodiment, the method may further comprise selectively blocking the coupling of a wire to at least one of the plurality of inputs using one of the jumper elements.

A further aspect of the invention may be directed to a method of selectively achieving multiple power configurations in an uninterruptible power supply of the type comprising an input module having three primary inputs L1, L2 and L3 and three bypass inputs B1, B2 and B3, and at least one jumper element configured to selectively couple at least one input of the plurality of inputs to at least one other input of the plurality of inputs. The at least one jumper element may comprise a first secondary jumper element configured to couple the primary input L1 to the bypass input B1, a second secondary jumper element configured to couple the primary input L2 to the bypass input B2, and a third secondary jumper element configured to couple the primary input L3 to the bypass input B3. In one embodiment, the method may comprise installing the first secondary jumper element, the second secondary jumper element and the third secondary jumper element to achieve a single power feed, a three phase input and a three phase output configuration.

Embodiments of the method may include selectively blocking the coupling of at least one of the plurality of inputs.

Yet another aspect of the invention may be directed to an uninterruptible power supply ("UPS") comprising an input module including a plurality of inputs and means to selectively couple the inputs to achieve the following configurations: single power feed, single phase input and single phase output; dual power feed, single phase input and single phase output; single power feed, three phase input and single phase output; dual power feed, three phase input and single phase output; single power feed, three phase input and three phase output; and dual power feed, three phase input and three phase output.

Embodiments of the UPS may comprise an output module including a plurality of outputs and an output module jumper element configured to couple at least one output of the plurality of outputs to at least one other output of the plurality of outputs. The plurality of outputs may comprise terminals L1, L2 and L3. In one embodiment, the UPS further may comprise a battery pack power distribution unit coupled to one of the plurality of outputs of the output power module. In another embodiment, the UPS further may comprise an alternate power source coupled directly to the output module.

BRIEF DESCRIPTION OF THE DRAWINGS

For a better understanding of the present invention, reference is made to the drawing figures which are incorporated herein by reference and in which:

FIG. 14 is a top plan view of the output power module showing a single phase hardwire output configuration;

FIG. 15 is a top plan view of the output power module showing a three phase hardwire output configuration;

FIG. 16 is a top plan view of the output power module showing a single phase output configuration that is connected to a battery pack power distribution unit.

DETAILED DESCRIPTION OF THE INVENTION

Figure 1:
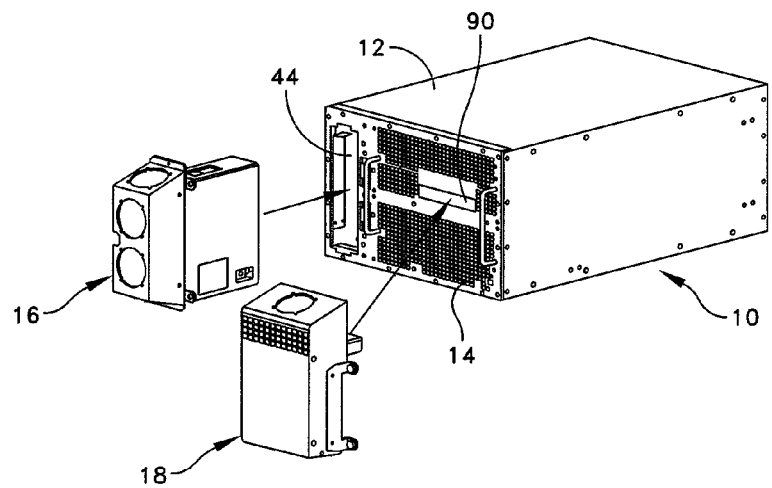
FIG. 1 is an exploded perspective view of an uninterruptible power supply ("UPS") having a input power module and an output power module of embodiments of the invention removed from a main body of the UPS.

For the purposes of illustration only, and not to limit the generality, the present invention will now be described in detail with reference to the accompanying figures. This invention is not limited in its application to the details of construction and the arrangement of components set forth in the following description or illustrated in the drawings. The invention is capable of other embodiments and of being practiced or being carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the invention provide an input module and an output module for use in a UPS, such as the UPS configurations described above. Embodiments of the invention can be used in systems and electronic devices, other than UPSs, that require electrical connections. Still other applications of embodiments of the invention are envisioned.

Figure 2:
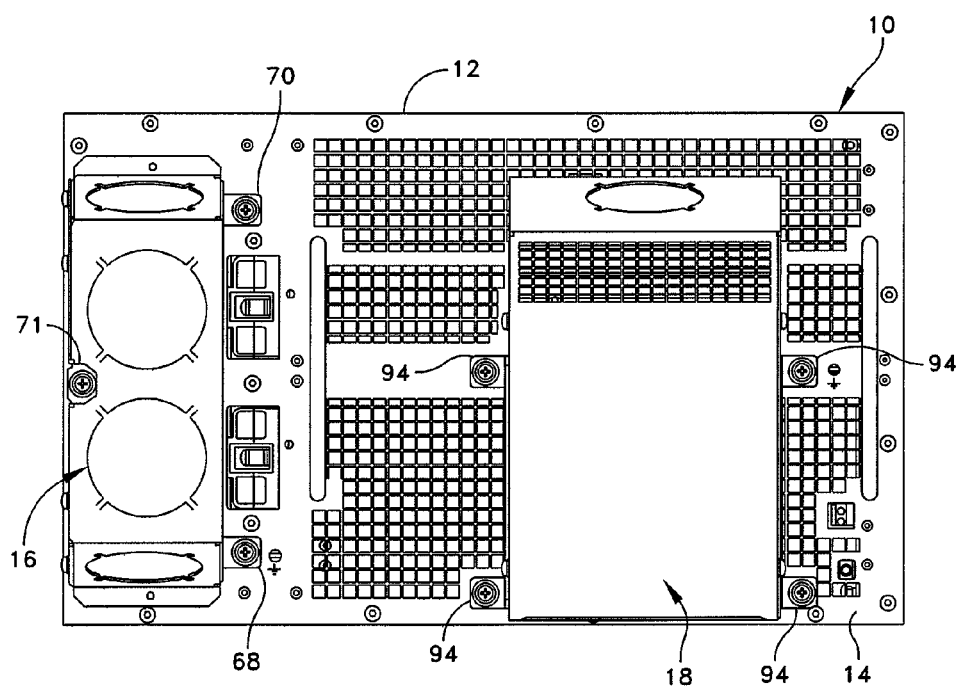
FIG. 2 is a rear elevational view of the UPS having the input power module and the output power module secured to the main body of the UPS.

Referring to FIGS. 1 and 2, an uninterruptible power supply ("UPS") is shown and generally indicated at 10. The UPS 10 can be a domestic or an international UPS model sold by American Power Conversion Corporation of West Kingstown, R.I., the assignee of the present invention. As discussed above, a UPS assists in providing a substantially consistent flow of power from a power source to electronic devices that are connected to the UPS. The UPS 10 includes a main body 12 having a plurality of functional components housed within the main body. FIGS. 1 and 2 illustrate a rear panel 14 of the main body 12 adapted to receive a power terminal input module generally indicated at 16 and a power terminal output module generally indicated at 18. The purpose of the input module 16 and the output module 18 is to provide electrical connections for peripheral electrical devices, while keeping wires of such devices sufficiently separated. For example, peripheral electrical devices can include, but are not limited to, servers, HVAC devices, refrigeration devices, control panels and motor controls, which are operated under the control of a controller (not shown in FIGS. 1 and 2) provided within the UPS.

Figure 3:
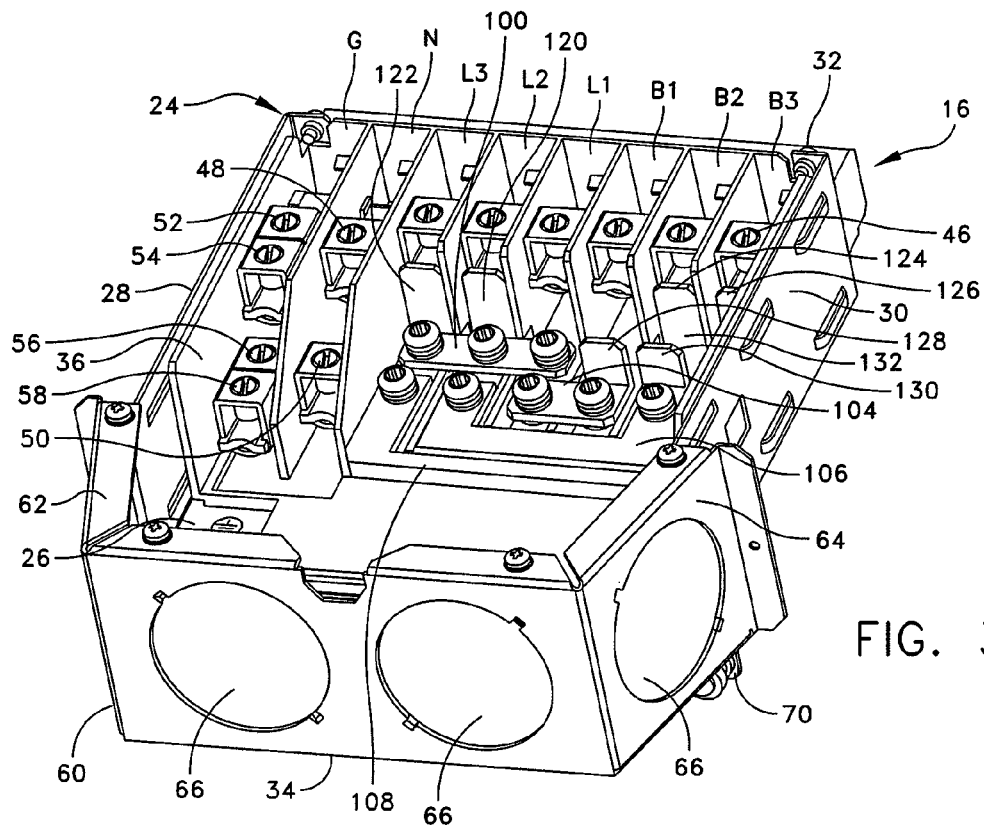
FIG. 3 is a rear perspective view of the input power module having a cover assembly removed to reveal an interior of the input power module.
Figure 4:
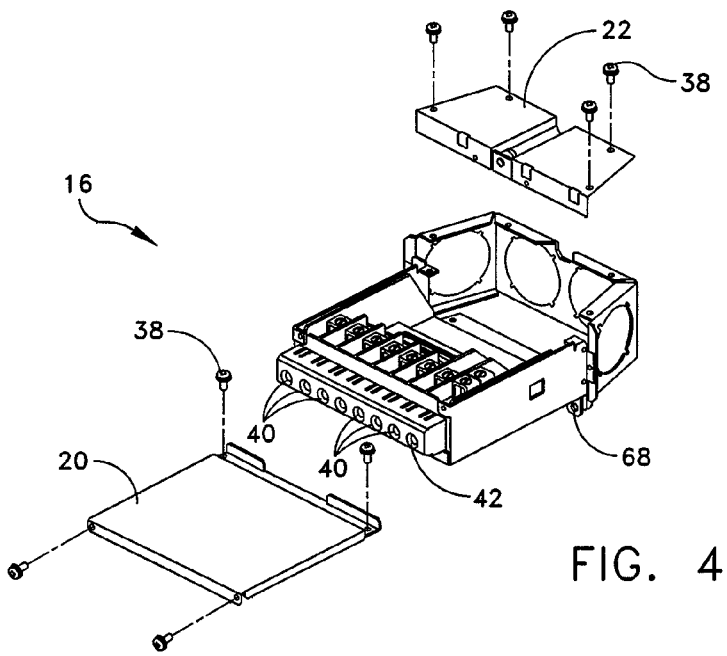
FIG. 4 is a front exploded perspective view of the input power module with the cover assembly shown prior to its attachment to a housing of the input power module.

Referring to FIGS. 3 and 4, the input module 16 that can be used in a UPS is shown in perspective view with a pair of top covers 20, 22 removed in FIG. 3 to show the interior of the module. As shown, the input module 16 includes a housing generally indicated at 24 having a bottom wall 26, two side walls 28, 30, a front 32 and a back wall 34, which together define an interior region of the housing. An insert 36, which may be fabricated from any suitable hard plastic or polymeric material, is disposed within the interior region of the housing 24 adjacent the front 32 of the housing. The insert 36 may be suitably secured to the housing 24 by screw fasteners (not shown) and/or integrated tabs that snap fit within openings or perforations formed in the bottom wall 26 and side walls 28, 30 of the housing. Referring to FIG. 4, the arrangement is such that the two top cover panels 20, 22, when secured to the housing in the manner shown, e.g., by screw fasteners 38, completely enclose the interior region of the housing 24.

Figure 5:
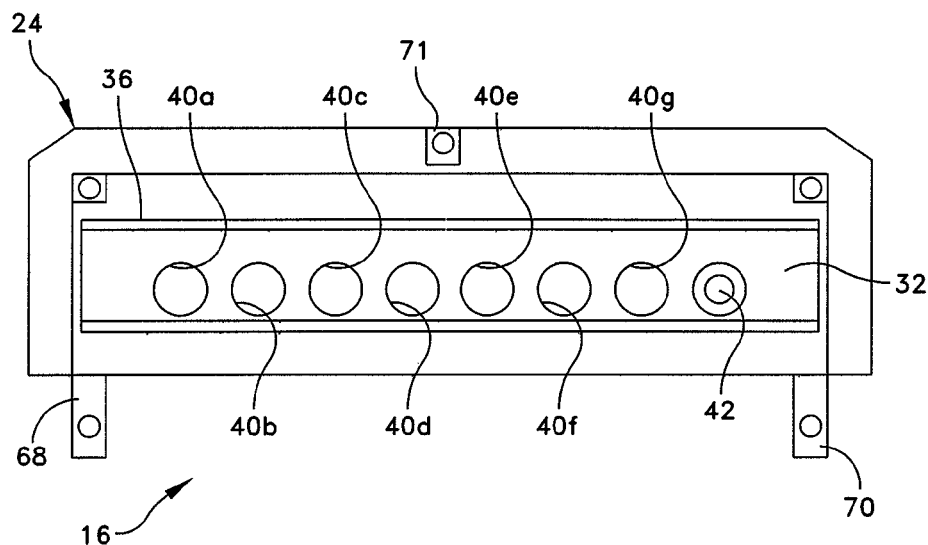
FIG. 5 is a front elevational view of the input power module.

As best shown in FIGS. 4 and 5, the insert 36 is configured at the front 32 of the housing 24 with seven socket terminals, each indicated at 40, and one pin terminal 42. The front 32 of the housing 24 of the input module 16 may be inserted and plugged into an input receptacle 44 provided in the UPS 10 in the manner illustrated in FIGS. 1 and 2. As shown in FIG. 5, the six left-hand socket terminals 40$a$, 40$b$, 40$c$, 40$d$, 40$e$ and 40$f$ are adapted to transfer a main alternating current ("AC") source and an auxiliary AC source to the UPS. The remaining socket terminal 40$g$ and the right-hand pin terminal 42 are configured to connect a neutral wire and earth ground wires (both not shown), respectively, to the UPS 10.

Figure 6:
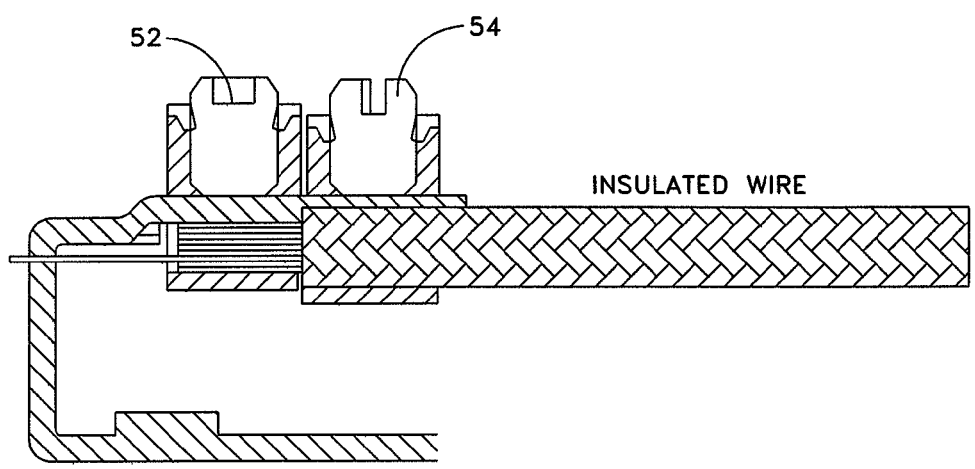
FIG. 6 is a cross-sectional view of a wire connected to a screw lug.

The interior region of the housing 24 of the input module 16 may be further configured to have eight stalls, each stall defining an electrical connection terminal. Specifically, the terminals are designated L1, L2, L3, B1, B2, B3, N and G in FIGS. 3 and 8-13, with the six right-hand terminals (designated B3, B2, B1, L1, L2 and L3 from right to left in FIGS. 3 and 8-13) being adapted to receive a main AC source and an auxiliary AC source in the manner described in greater detail below. Each of the six terminals L1, L2, L3, B1, B2 and B3 have a screw lug each indicated at 46 configured to secure an electrical wire or cable (not shown) in a well-known manner. The electrical wire may be crimped, screwed or otherwise fastened into a contacting position with the screw lug. For electrical and mechanical connection, the screw lugs 46 are substantially exposed within their respective stalls. As shown, the six right-hand terminals (i.e., B3, B2, B1, L1, L2 and L3 in FIGS. 3 and 8-13) may be positioned adjacent respective socket terminals (i.e., 40$a$, 40$b$, 40$c$, 40$d$, 40$e$ and 40$f$, respectively). The two left-hand terminals (i.e., N and G as shown in FIGS. 8-13) are adapted to receive neutral and ground wires (not shown) and correspond to the remaining socket terminal (i.e., 40$g$) and the pin terminal (i.e., 42) described above. As shown, the neutral N terminal includes two screw lugs 48, 50 and the ground terminal G includes four screw lugs 52, 54, 56 and 58. The provision of two screw lugs 48, 50 within the neutral terminal N and four screw lugs 52, 54, 56 and 58 within the ground terminal G enables the connection of the neutral and ground wires from both AC sources (main and auxiliary) with the forward screw lug (e.g., screw lug 52) secured to the bare wire and the rearward screw lug (e.g., screw lug 54) secured to the insulation in the manner illustrated in FIG. 6. The securement of the rearward screw lug to the insulation may provide strain relief to the wire or cable.

Referring back to FIG. 3, in a certain embodiment, the back wall 34 includes a back wall portion 60 and two side wall portions 62, 64, each side wall portion extending at an angle from opposite sides of the back wall portion. The back wall 34 has four circularly-shaped, perforated cutouts, each indicated at 66, formed therein. As shown, two cutouts 66 are formed on the back wall portion of the housing and each side wall portion (62, 64) has a cutout 66 formed therein. The cutouts 66 are provided to be selectively removed from the back wall 34 of the housing 24 to enable cables or wires to pass therethrough for connection to the terminals. Three tabs 68, 70 and 71 are provided to secure the input module 16 to the UPS 10 in the manner shown in FIG. 2.

Figure 7A:
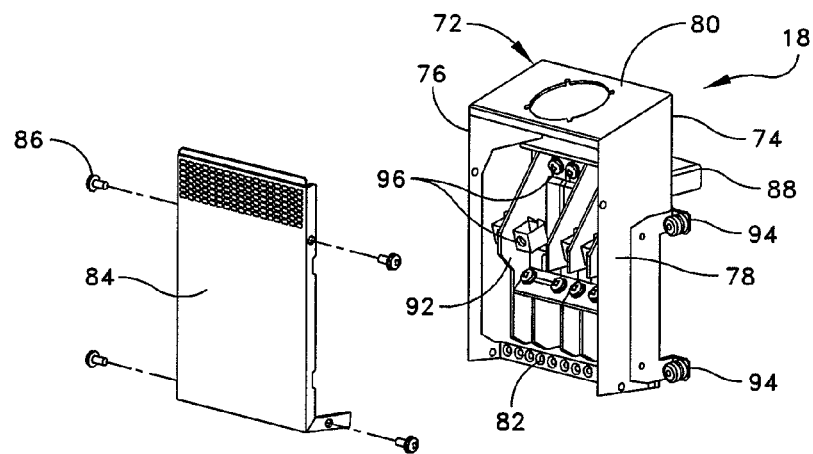
FIG. 7A is a rear perspective view of the output power module having a cover removed to reveal an interior of the output power module.
Figure 7B:
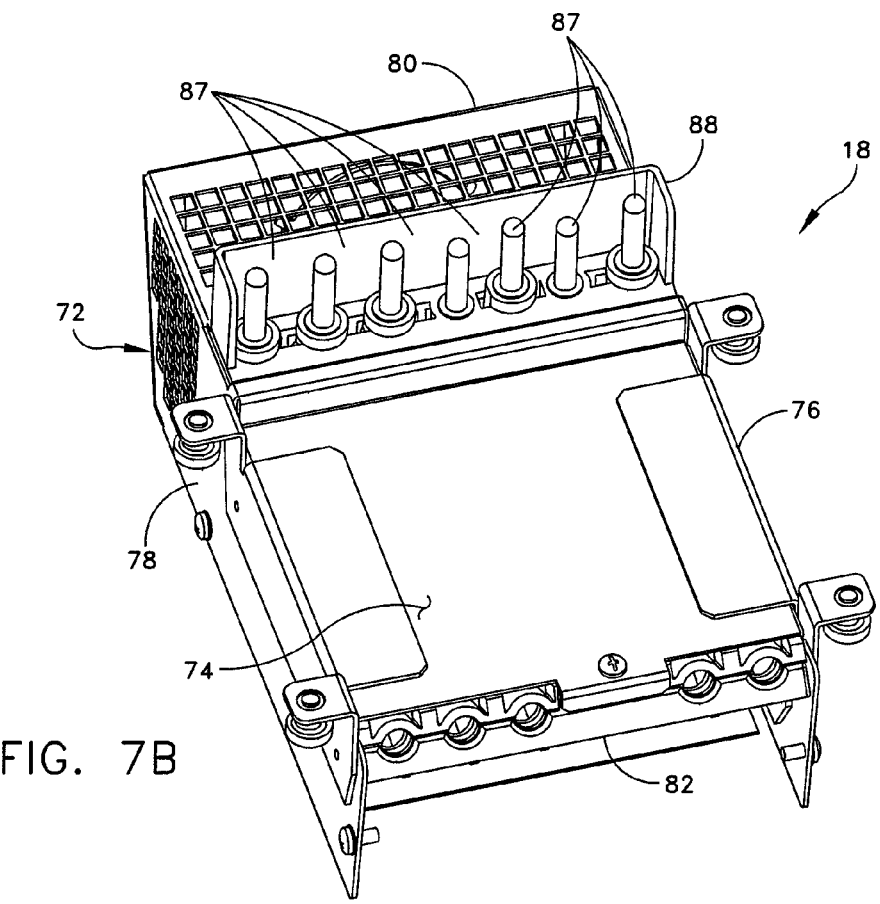
FIG. 7B is a front perspective view of the output power module shown in FIG. 7A.

Referring to FIGS. 7A and 7B, the output module 18 includes a housing generally indicated at 72 having a front wall 74, two side walls 76, 78, a top wall 80 and a bottom 82, which together define an interior region of the housing. The arrangement is such that a cover 84, when secured to the housing 72, completely encloses the interior region of the housing. Screw fasteners 86 may be provided to secure the cover 84 to the housing 72. The output module 18 is configured with seven pin terminals 87 provided in a formation 88 projecting from the front wall 74 of the housing, which is pluggable into a socket 90 provided in the UPS 10 (FIG. 1). An insert 92 is disposed within the interior region of the housing 72. The insert 92 may be suitably secured to the housing 72 by screw fasteners (not shown) and/or tabs that snap fit within openings or perforations formed in the front wall 74 and/or the side walls 76, 78 of the housing. The pin terminals are designed to receive conditioned power from the UPS.

The interior region of the housing 72 of the output module 18 may be further configured to have five stalls, each stall defining an electrical connection terminal, which correspond to five of the seven pin terminals described above. Specifically, the insert 92 of the output module may be configured with five socket terminals corresponding to terminals L2, L2, L3, N and G shown in FIGS. 14-16. In one embodiment, and as described above, the front wall 74 of the housing 72 may be configured with the seven pin terminals within the formation 88 that enable the output module to be inserted and plugged into the output socket receptacle 90 provided in the UPS in the manner illustrated in FIG. 1. Tabs, each indicated at 94, may be provided to secure the output module 18 to the UPS 10.

As described above, the insert 74 is provided with five terminals, which correspond to five of the seven pin terminals that are plugged into the UPS 10, each terminal having a screw lug 96 configured to secure an electrical wire or cable (not shown), which is connected to a device, such as a computer, monitor, printer, server, etc., that is coupled to the UPS. As with the input module 16, the electrical wire may be crimped, screwed or otherwise fastened into a contacting position with the screw lug 96. For electrical and mechanical connection, the screw lugs 96 are substantially exposed within their respective stalls. The three right-hand terminals L1, L2 and L3 may be configured to receive three phase wires. The two left-hand terminals N and G are adapted to receive neutral and ground wires, respectively. This aspect of the invention will be discussed in greater detail with reference to the description of FIGS. 14-16 below. The remaining two pin terminals may serve to provide two different detection signals to the UPS 10. For example, the first signal may provide an indication whether the output module 18 is plugged into the UPS 10. When the output module is unplugged from the UPS, the UPS power output shuts down, thereby assuring safety at the output contacts. Also, the UPS 10 output is not allowed to turn ON if the output module 16 is missing or not plugged in.

The second signal may be provided to indicate one or three phase distribution. The presence of an output shorting jumper (as described below) indicates that the UPS 10 is configured for single phase output.

In a certain embodiment, the top wall 80 of the housing 72 of the output module 18 includes a circularly-shaped, perforated cutout 98 formed therein. The cutout 98 is provided to be selectively removed from the top wall 80 of the housing 72 to enable cables or wires to pass therethrough for connection to the terminals.

Figure 8:
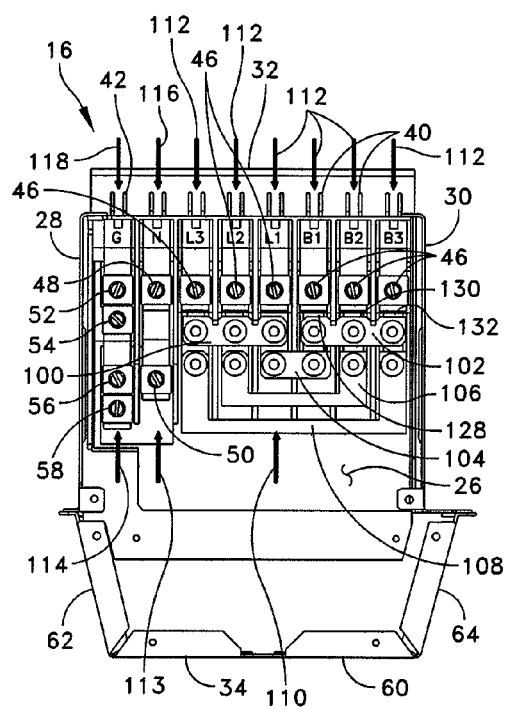
FIG. 8 is a top plan view of the input power module showing a single feed, a single phase input and a single phase output configuration.
Figure 9:
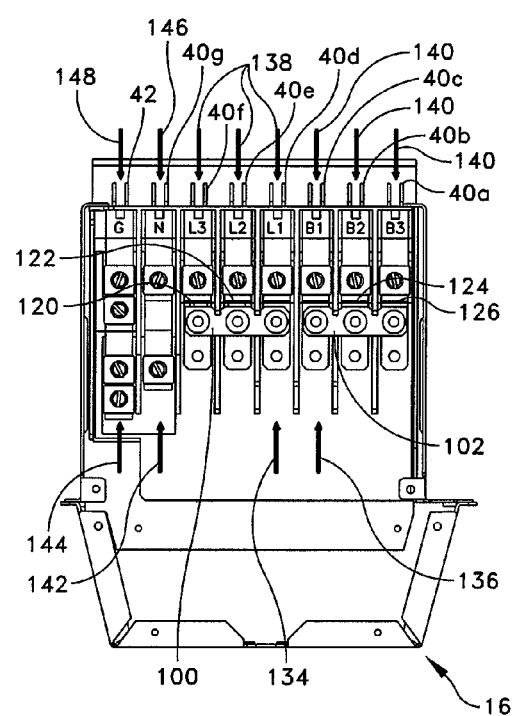
FIG. 9 is a top plan view of the input power module showing a dual feed, a single phase input and a single phase output configuration.
Figure 10:
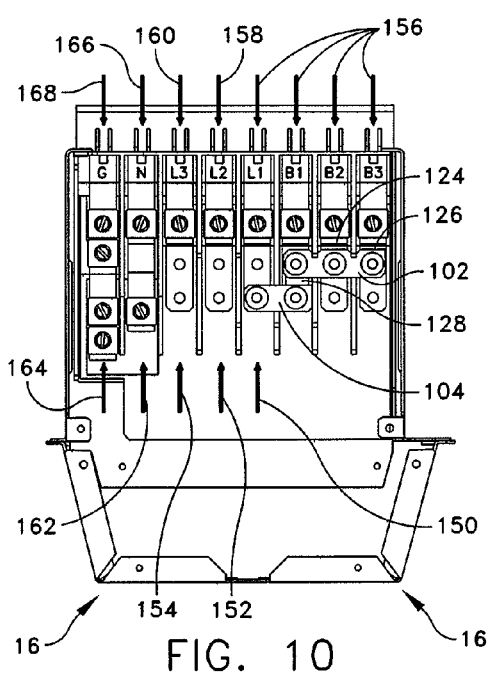
FIG. 10 is a top plan view of the input power module showing a single feed, a three phase input and a single phase output configuration.
Figure 11:
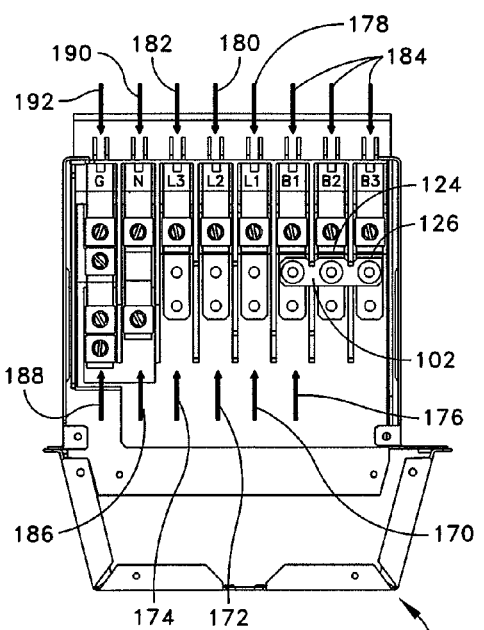
FIG. 11 is a top plan view of the input power module showing a dual feed, a three phase input and a single phase output configuration.
Figure 12:
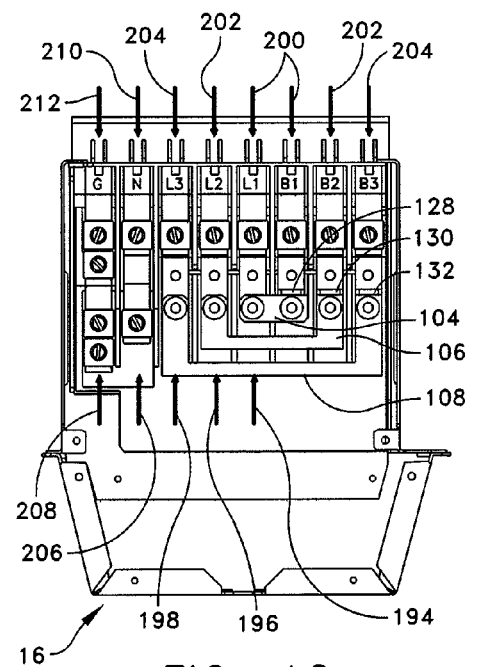
FIG. 12 is a top plan view of the input power module showing a single feed, a three phase input and a three phase output configuration.
Figure 13:
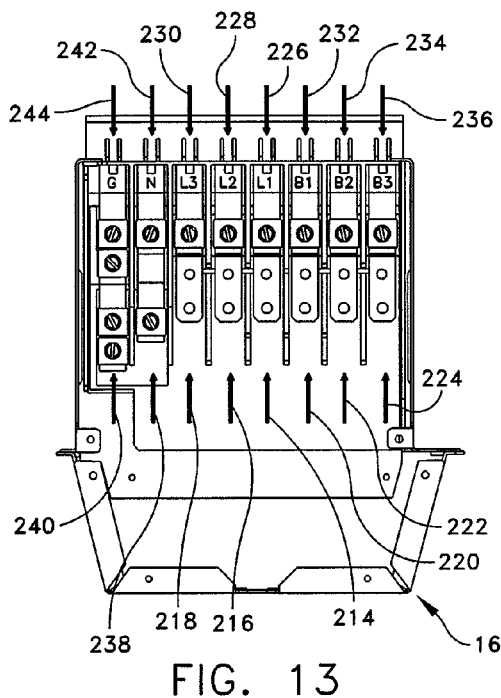
FIG. 13 is a top plan view of the input power module showing a dual feed, a three phase input and a three phase output configuration.

Turning now to FIGS. 8-13, the input module may be selectively configured to accommodate a variety of wiring schemes. In particular, FIG. 8 illustrates a single feed, a single phase input and a single phase output configuration. FIG. 9 illustrates a dual feed, a single phase input and a single phase output configuration. FIG. 10 illustrates a single feed, a three phase input and a single phase output configuration. FIG. 11 illustrates a dual feed, a three phase input and a single phase output configuration. FIG. 12 illustrates a single feed, a three phase input and a three phase output configuration. And finally, FIG. 13 illustrates a dual feed, a three phase input and a three phase output configuration. In a certain embodiment, in order to achieve any one of the desired configurations, a kit of jumper elements may be provided. Specifically, by installing jumper elements in the manner described below, a desired configuration may be achieved by a person installing the input module 16. When a shorting jumper element is installed, the respective socket terminals 40 are connected in parallel and the total alternating current ("AC") is distributed equally among these paralleled terminals. In another embodiment, the jumper elements may be replaced by a control, such as a rotary switch or relays, to provide the desired connections of the terminals.

Referring first to FIG. 8, to achieve a single power feed, a single phase input and a single phase output configuration, the input module 16 may be configured with a main shorting jumper element 100, a bypass shorting jumper element 102, and three secondary shorting jumper elements 104, 106 and 108. In a certain embodiment, the jumper elements 100, 102, 104, 106 and 108 may be secured to their respective terminals L1, L2, L3, B1, B2 and B3 in the manner described below by screw fasteners (not shown). Single phase AC current provided by a main source may be connected by means of a wire, cable or other suitable flexible connector (referred to as a "wire" or "cable" herein) to screw lug 46 of terminal L1. This connection is represented by arrow 110 in FIG. 8. Arrows 112 represent the socket terminals 40a, 40b, 40c, 40d, 40e and 40f, which are connected in parallel. The total AC current through the wire represented by arrow 110 is distributed among socket terminals L1, L2, L3 or B1, B2, B3 depending on the UPS 10 mode of operation. To complete the connection, the neutral wire is connected to screw lugs 48, 50 and the ground wire is connected to screw lugs 52, 54 or 56, 58, which are provided on the neutral terminal N and ground terminal G, respectively. Arrows 113, 114 represent the connection of the wires to the respective neutral and ground terminals, respectively. Arrows 116, 118 represent the connection of the neutral and ground terminals to the UPS 10 via the socket terminal 40 (specifically 40g in FIG. 5) and the pin terminal 42.

To prevent the unwanted connection of the single phase main source wire to the other screw lugs 46 of the main source connections, i.e., terminals L2 and L3, the main shorting jumper element 100 is configured with two blocking segments 120, 122. As shown in FIG. 3, the blocking segments 120, 122 extend along a generally vertical plane from the main shorting jumper element. In one embodiment, the main shorting jumper element 100 and the blocking segments 120, 122 are fabricated from a piece of stamped metal material suitable to provide electrical communication between the terminals. The blocking segments 120, 122, as with the blocking segments described below, are sized so as to prevent the physical connection of a wire to the terminals L2 and L3. Similarly, to prevent the unwanted connection of the single phase main source wire to the screw lugs 46 of the bypass source connections, i.e., terminals B1, B2 and B3, the bypass shorting jumper element 102 includes two blocking segments 124, 126. In addition, the three secondary jumper elements each have a blocking segment to prevent the unwanted connection of the single phase main source wire to any of the bypass source connections. Specifically, the first secondary jumper element 104, which provides electrical communication between terminals L1 and B1, includes a blocking segment 128 to prevent access to terminal B1. The second secondary jumper element 106, which provides electrical communication between terminals L2 and B2, includes a blocking segment 130 to prevent access to terminal B2. And lastly, the third secondary jumper element 108, which provides electrical communication between terminals L3 and B3, includes a blocking segment 132 to prevent access to terminal B3.

Referring to FIG. 9, to achieve a dual feed, a single phase input and a single phase output configuration, the input module 16 may be configured with the main shorting jumper element 100 and the bypass shorting jumper element 102. As shown, single phase AC current provided by a main source is connected by means of a wire to the screw lug of terminal L1. This connection is represented by arrow 134 in FIG. 9. Similarly, a single phase AC current by an alternate source is connected by a wire to the screw lug of terminal B1. This connection is represented by arrow 136. As described above, the alternate source may be taken from a second power source, e.g., secondary AC power source, battery, generator, or any other suitable backup power source. Arrows 138 represent the socket terminals 40d, 40e, 40f, which are connected in parallel. The total AC current provided by the main power source through the wire represented by arrow 134 is distributed among socket terminals L1, L2, L3 to the UPS 10. During bypass operation of the UPS 10, arrows 140 represent the socket terminals 40a, 40b, 40c, which are connected in parallel. The total AC current provided by the alternate power source through the wire represented by arrow 136 distributed among socket terminals B1, B2, B3 to the UPS 10. To complete the connection, the neutral and ground wires are connected to screw lugs 48, 50, 52, 54, 56 and 58 provided on the neutral terminal N and the ground terminal G, respectively. Arrows 142, 144 represent the connection of the wires to the respective neutral and ground terminals. Arrows 146, 148 represent the connection of the neutral and ground terminals to the UPS 10 via the socket terminal 40g and the pin terminal 42.

To prevent the unwanted connection of the single phase main source wire to the other screw lugs 46 of the main source connections, i.e., terminals L2 and L3, the main shorting jumper element 100 is configured with two blocking segments 120, 122 positioned in front of these terminals. Similarly, to prevent the unwanted connection of the single phase alternate source wire to the screw lugs of the bypass source connections, i.e., terminals B2 and B3, the bypass shorting jumper element 102 includes two blocking segments 124, 126 positioned in front of these terminals.

Referring to FIG. 10, to achieve a single feed, a three phase input and a single phase output configuration, the input module 16 may be configured with the bypass shorting jumper element 102 and the first secondary jumper element 104. As shown, three phase AC current provided by a main source is connected by means of three wires to the screw lugs of terminals L1, L2 and L3. This connection is represented by arrows 150, 152 and 154 in FIG. 10. Arrows 156, 158 and 160 represent the connection of the socket terminals corresponding terminals L1, L2 and L3 to the UPS 10 (specifically, socket terminals 40d, 40e and 40f as shown in FIG. 5) and during bypass operation of UPS 10, arrows 156 represent the socket terminals 40, 40b, 40c, which are connected in parallel. The total AC current through the wire represented by arrow 152 is distributed among socket terminals B1, B2, B3. To complete the connection, the neutral and ground wires are connected to the screw lugs provided on the neutral terminal N and ground terminal G, respectively. Arrows 162, 164 represent the connection of the wires to the respective neutral and ground terminals. Arrows 166, 168 represent the connection of the neutral and ground terminals to the UPS 10 via the socket terminal 40g and the pin terminal 42.

To prevent the unwanted connection of the three phase main source wires to the screw lugs of the alternate power source connections, i.e., terminals B1, B2 and B3, the bypass shorting jumper element 102 is configured with two blocking segments 124, 126 positioned in front of two of the bypass terminals, e.g., terminals B2 and B3, and the first secondary jumper element 104 is configured with a single blocking segment 128 positioned in front of the remaining bypass terminal, e.g., terminal B1.

Referring to FIG. 11, to achieve a dual feed, a three phase input and a single phase output configuration, the input module 16 may be configured with the bypass shorting jumper element 102 only. As shown, three phase AC current provided by a main source is connected by means of three wires to the screw lugs of terminals L1, L2 and L3. This connection is represented by arrows 170, 172 and 174 in FIG. 11. Similarly, a single phase AC current by an alternate source is connected by a wire to the screw lug of terminal B1. Arrow 176 represents this connection to terminal B1. Arrows 178, 180, 182 represent the connection of socket terminals corresponding to terminals L1, L2, L3 to the UPS (specifically, socket terminals 40d, 40e, 40f, respectively, as shown in FIG. 5). Arrow 184 represent the socket terminals 40a, 40b, 40c, which are connected in parallel. The total AC current through the wire represented by arrow 176 is distributed among socket terminals B1, B2, B3. To complete the connection, the neutral and ground wires are connected to the screw lugs provided on the neutral terminal N and ground terminal G, respectively. Arrows 186, 188 represent the connection of the wires to the respective neutral and ground terminals. Arrows 190, 192 represent the connection of the neutral and ground terminals to the UPS via the socket terminal 40g and the pin terminal 42.

To prevent the unwanted connection of the single phase alternate source wire to the other screw lugs of the alternate source connections, i.e., terminals B2 and B3, the bypass shorting jumper element 102 is configured with two blocking segments 124, 126 positioned in front of these terminals.

Referring to FIG. 12, to achieve a single feed, a three phase input and a three phase output configuration, the input module 16 may be configured with the first secondary jumper element 104, the second secondary jumper element 106 and the third secondary jumper element 108. As shown, three phase AC current provided by a main power source is connected by means of three wires to the screw lugs of terminals L1, L2 and L3. This connection is represented by arrows 194, 196 and 198 in FIG. 12. Arrows 200, 202 and 204 represent the current through the socket terminals corresponding to terminals L1, L2, L3 (specifically, socket terminals 40d, 40e, 40f, respectively, as shown in FIG. 5) to the UPS 10 or through the socket terminals corresponding to terminals B1, B2, B3 (specifically, socket terminals 40a, 40b, 40c, as shown in FIG. 5) depending on the UPS 10 mode of operation. To complete the connection, the neutral and ground wires are connected to the screw lugs provided on the neutral terminal N and ground terminal G, respectively. Arrows 206, 208 represent the connection of the wires to the respective neutral and ground terminals. Arrows 210, 212 represent the connection of the neutral and ground terminals to the UPS 10 via the socket terminal 40g and the pin terminal 42.

To prevent the unwanted connection of the three phase main power source wires to the screw lugs of the alternate source connections, i.e., terminals B1, B2 and B3, the first, second and third secondary jumper elements 104, 106, 108 are configured with blocking segments 128, 130, 132, respectively, which are positioned in front of these terminals. As shown, the first, second and third secondary jumper elements 104, 106, 108 may direct power from the main AC source to the main UPS circuit and to the bypass UPS circuit.

Referring to FIG. 13, to achieve a dual feed, a three phase input and a three phase output configuration, the input module may be configured without any of the aforementioned jumper elements, i.e., jumper elements 100, 102, 104, 106 and 108. As shown, three phase AC current provided by a main power source is connected by means of three wires to the screw lugs of terminals L1, L2 and L3. This connection is represented by arrows 214, 216 and 218 in FIG. 13. Similarly, three phase AC current provided by a bypass source is connected by means of three wires to the screw lugs of terminals B1, B2 and B3. Arrows 220, 222 and 224 represent this connection. Arrows 226, 228, 230, 232, 234 and 236 represent the connection of the socket terminals corresponding to terminals L1, L2, L3, B1, B2 and B3 to the UPS 10 (specifically, socket terminals 40d, 40e, 40f, 40a, 40b and 40c, respectively, as shown in FIG. 5). To complete the connection, the neutral and ground wires are connected to the screw lugs provided on the neutral terminal N and ground terminal G, respectively. Arrows 238, 240 represent the connection of the wires to the respective neutral and ground terminals. Arrows 242, 244 represent the connection of the neutral and ground terminals to the UPS 10 via the socket terminal 40g and the pin terminal 42.

Turning to FIGS. 14-16, and more particularly to FIG. 14, to achieve a single phase output connection, the output module 18 may be configured with an output shorting jumper element 246. In a certain embodiment, the output shorting jumper element 246 may be secured to terminals L1, L2, L3 and N by screw fasteners. As shown, single phase current is provided from the UPS 10 by means of pin terminals on L1, L2 and L3, which are provided in the formation 88 projecting from the front wall 74 of the housing, and the output shorting jumper element 246. The formation 88 is pluggable into the socket 90 provided in the UPS 10 (see FIG. 1). This connection is represented by arrows 248 in FIG. 14. Arrow 250 represents the connection of the terminal corresponding to terminal L3 to a desired hardwired output. It should be understood that the connection could be made either of the other two terminals L1 and L2. To complete the connection, the neutral and ground wires are connected to screw lugs 96 provided on the neutral terminal N and ground terminal G, respectively. Arrows 254, 252 represent the connection of the wires to the respective neutral and ground terminals to the output. As described above, the wires represented by arrows 250, 252, 254 may be connected to any device requiring conditioned power. For example, the device may include but is not limited to computers, servers, auxiliary devices, etc.

The UPS 10 may be configured to communicate with sensors that measure voltages across all of the terminals L1, L2, L3, B1, B2 and B3. The information obtained from the sensors may be processed for determining as to the type of AC power source connected to the UPS, and for warning an operator of an improper configuration.

Referring to FIG. 15, to achieve a three phase output connection, three phase current is provided from the UPS 10 by means of three pin terminals L1, L2 and L3 of the output module 18. This connection is represented by arrows 256, 258, 260 in FIG. 15. Arrows 262, 264 and 266 represent the connection of the terminals corresponding to terminals L1, L2 and L3, respectively to a desired hardwired output. To complete the connection, the neutral and neutral wires are connected to screw lugs 96 provided on the neutral terminal N and ground terminal G, respectively. Arrows 268, 270 represent the connection of the wires to the respective neutral and ground terminals to the output.

Referring now to FIG. 16, to achieve a single phase output connection to a battery pack power distribution unit ("PDU") 272, the output module 18 may be configured with the output shorting jumper element 246. As shown, single phase current is provided from the UPS 10 by means of a PDU connector to screw lug 96 of terminal L1. This connection is represented by arrow 276 in FIG. 16. Arrow 278 represents the connection of the terminal corresponding to terminal L1 to the desired hardwired output. As with the configuration illustrated in FIG. 14, to complete the connection, a neutral connector 280 and a ground connector 282 associated with the battery pack 272 are connected to screw lugs 96 provided on the neutral terminal N and ground terminal G, respectively. Arrows 284, 286 represent the connection of the connectors 280, 282 to the neutral and ground terminals, respectively. Arrows 288, 290 represent the connection of the wires to the respective neutral and ground terminals to the desired hardwired output.

As further illustrated in FIGS. 14-16, the output module 18 may be provided with a strain relief bar 292 to secure the assist in preventing the unwanted or unintentional removal of the wires connected to the terminals.

The output module 18, when provided with the output jumper element 246, provides single phase AC output. When the output jumper element 246 is removed, the output module 18 may be wired to provide three phase AC power to the desired hardwired output. The UPS 10 may be configured to communicate with sensors that measure voltages across all of the terminals L1, L2 and L3 and/or the output jumper element 246 of the output module 18. The information obtained from the sensors may be processed for determining an improper power configuration, and for warning an operator of the improper configuration.

Figure 17:
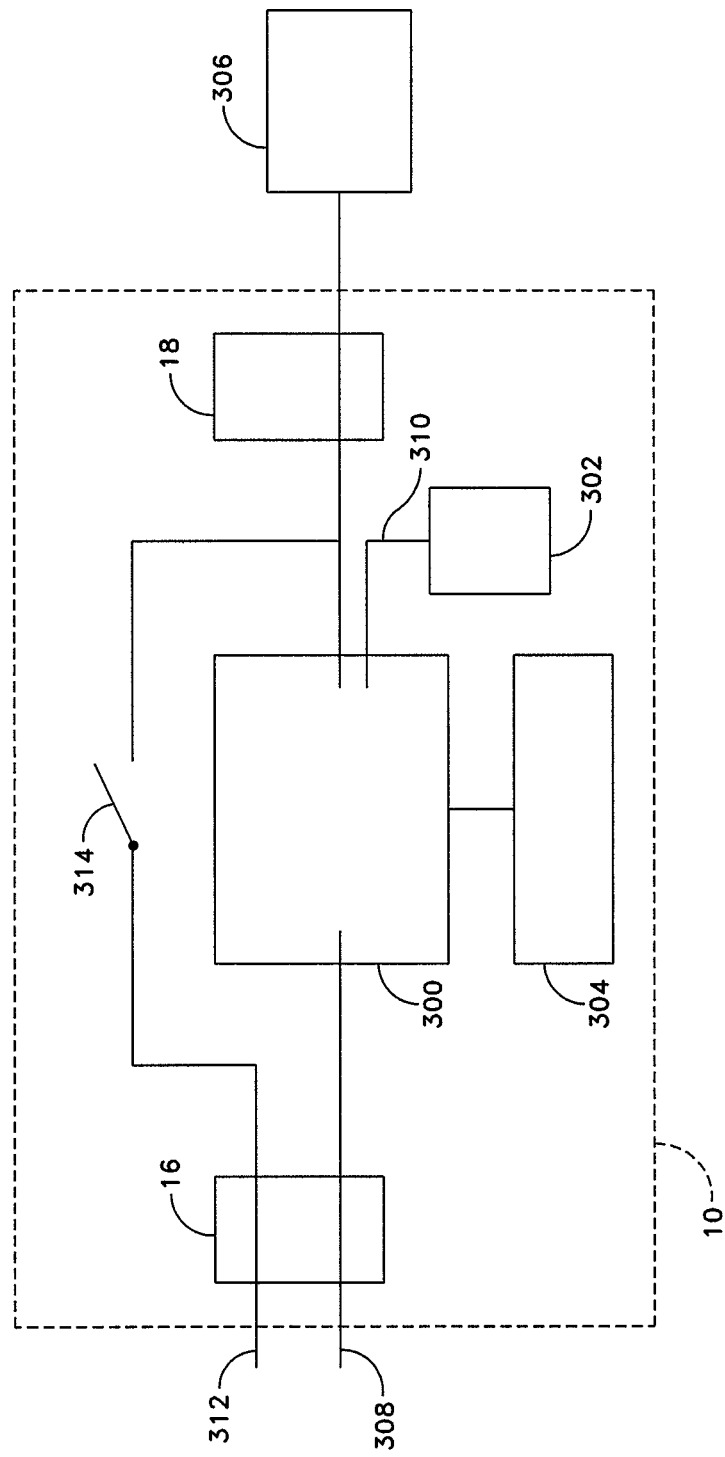
FIG. 17 is a schematic block diagram of the UPS of embodiments of the invention.

FIG. 17 illustrates the operation of the input module 16 and the output module 18 within the UPS 10. FIG. 17 illustrates schematically the input module 16, the output module 18, a converter 300 of the UPS 10, a battery 302, and a controller 304, which controls the operation of the UPS. As discussed above, during normal operation, the UPS converter 300 is designed to covert utility power to conditioned power for a connected load 306.

As shown, power travels from a primary power source into and from the input module 16, to the UPS converter 300, and to the output module 18 along line 308. During a power disturbance or interruption, for example, the UPS 10 may be configured to provide power to the connected load 306 via the output module 18 from the battery 302 (or batteries) for a finite period of time. Specifically, the UPS 10 transfers to battery operation if the supply of utility power fails or is outside predefined limits. As shown, the battery 302 provides power directly to the converter 300 along line 310 and to the output module 18.

Power travels from the primary (or an alternate) power source into and from the input module 16, around the UPS converter 300, and to the output module 18 along line 312. During bypass operation, bypass mode is reached either as a user selection or automatically under the control of the controller by employing a switch 314. For example, the UPS 10 may be configured with a display (not shown) that provides a menu screen to manually select the bypass mode. Alternatively, the controller 304 may be configured to automatically switch to bypass mode if, for example, the following conditions occur: both normal and battery operation modes are unavailable; an output overload condition occurs, or if the UPS incurs an internal fault or trigger. As shown, during bypass operation, the utility power is connected to the load 306, bypassing the converter 300. If bypass mode becomes unavailable, the UPS will automatically switch to main power. In the event the main power is unavailable, the controller 304 will switch to battery power.

In one embodiment, a rotary switch may be provided in place of the main, bypass and supplemental jumpers. In another embodiment, the input module and the output module may be configured to provide split phase power. In yet another embodiment, the voltages of the terminals L1, L2, L3, B1, B2, B3 of the input module may be sensed and processed by the controller for determining the type of AC source connected and for determining and providing a warning to the operator of any improper configuration.

Thus, it should be observed that the UPS of embodiments of the invention may enable a system operator to have one UPS for different input and output power configurations, which ultimately reduces cost of ownership of the system, simplifies and reduces cost of manufacturing, service, repair and installation. In addition, the UPS of embodiments of the invention may be configured to accept AC power input from up to two separate sources. In a first instance, the first source may be configured to either feed both the main UPS circuit and the bypass UPS circuit in the case of a single feed application. In a second instance, the first source feeds the main UPS circuit and the second source feeds the bypass UPS circuit in the case of a dual feed application. Each of these input sources may be configured as one phase or three phases independently from each other.

Also, the UPS of embodiments of the invention may be configured to have AC input and output jumpers, and with respect to the input module, the input jumpers may be further configured to prevent the miswiring of the input output module. Based on all six input voltage measurements and output phase configuration jumper, a determination may be made of improper power configuration.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A configurable power module for an Uninterruptible Power Supply (UPS), the power module comprising:
    a housing having an exterior region and an interior region;
    a plurality of input terminals located in the interior region of the housing, each input terminal being configured to be coupled to a wire;
    a plurality of output terminals located on the exterior region of the housing, each output terminal being electrically coupled to at least one of the plurality of input terminals and configured to be coupled to a receptacle of the UPS; and
    at least one jumper element adapted to connect at least two of the plurality of input terminals in parallel,
    wherein the plurality of input and output terminals are configured to provide a wiring scheme; and
    wherein the wiring scheme is selectively configured based on the configuration of the at least one jumper element.

2. The power module of claim 1, wherein the wiring scheme is configured as one of a single feed wiring scheme or multi-feed wiring scheme depending on the configuration of the at least one jumper element.

3. The power module of claim 1, wherein the wiring scheme is configured as one of a single phase wiring scheme or multi-phase wiring scheme depending on the configuration of the at least one jumper element.

4. The power module of claim 1, wherein the wiring scheme is configured as one of a single phase input, single phase output, multi-phase input, or multi-phase output wiring scheme.

5. The power module of claim 1, wherein the power module is an input power module, and wherein the plurality of input terminals are coupled to at least one external AC source and are configured to receive at least one input AC signal from the external AC source and transfer at least one output AC signal to the UPS via the plurality of output terminals.

6. The power module of claim 5, wherein a first segment of the plurality of input terminals are configured to be coupled to a main AC source and a second segment of the plurality of input terminals are configured to be coupled to an auxiliary AC source.

7. The power module of claim 1, wherein the power module is an output power module, wherein the plurality of input terminals are coupled to at least one external device, and wherein the plurality of output terminals are configured to receive an input AC signal from the UPS and transfer an output AC signal to the at least one external device via the plurality of input terminals.

8. The power module of claim 1, wherein at least one jumper element comprises at least one blocking segment configured to prevent physical access to at least one of the plurality of input terminals.

9. The power module of claim 1, wherein the plurality of output terminals includes a neutral output terminal and the plurality of input terminals includes a neutral input terminal, and wherein the neutral input terminal is coupled to a neutral wire.

10. The power module of claim 1, wherein the plurality of output terminals includes a ground output terminal and the plurality of input terminals includes a ground input terminal, and wherein the ground input terminal is coupled to a ground wire.

11. The power module of claim 1, wherein each of the plurality of input terminals comprises a screw lug, and wherein the screw lug is configured to be coupled to the wire.

12. The power module of claim 1, further comprising at least one cutout configured to provide access from the external region to the internal region and to receive the wire.

13. A method for providing a configurable power module for an Uninterruptible Power Supply (UPS), the method comprising:
    providing a housing having an exterior region and an interior region;
    providing a plurality of input terminals located in the interior region of the housing, each input terminal being configured to be coupled to a wire;

providing a plurality of output terminals located on the exterior region of the housing, each output terminal being electrically coupled to at least one of the plurality of input terminals and configured to be coupled to a receptacle of the UPS;

connecting at least two of the plurality of input terminals in parallel with at least one jumper element; and selectively configuring the plurality of input and output terminals to provide a wiring scheme based on the configuration of the at least one jumper element.

14. The method of claim 13, wherein selectively configuring the plurality of input and output terminals includes configuring the plurality of input and output terminals to provide one of a single feed wiring scheme or multi-feed wiring scheme depending on the configuration of the at least one jumper element.

15. The method of claim 13, wherein selectively configuring the plurality of input and output terminals includes configuring the plurality of input and output terminals to provide one of a single phase wiring scheme or a multi-phase wiring scheme depending on the configuration of the at least one jumper element.

16. The method of claim 13, wherein selectively configuring the plurality of input and output terminals includes configuring the plurality of input and output terminals to provide one of a single phase input, single phase output, multi-phase input, or multi-phase output wiring scheme.

17. The method of claim 13, further comprising:

receiving, with at least one of the plurality of input terminals, at least one input AC signal from an external AC source; and transferring at least one output AC signal to the UPS via the plurality of output terminals.

18. The method of claim 17, wherein receiving at least one input AC signal includes receiving a main AC signal and an auxiliary AC signal, and wherein transferring at least one output AC signal includes transferring a main output AC signal and an auxiliary output AC signal.

19. The method of claim 13, further comprising:

receiving, with at least one of the plurality of output terminals, at least one input AC signal from the UPS; and transferring at least one output AC signal to at least one external device via the plurality of input terminals.

20. The method of claim 13, further comprising preventing physical access to at least one of the plurality of input terminals.

* * * * *